April 13, 1948.

H. J. FINDLEY 2,439,685

THREAD INSERT

Filed Sept. 30, 1943

INVENTOR.
HOWARD J. FINDLEY
BY
Kwis Hudson Boughton & Williams
ATTORNEYS

Patented Apr. 13, 1948

2,439,685

UNITED STATES PATENT OFFICE 2,439,685

THREAD INSERT

Howard J. Findley, Shaker Heights, Ohio, assignor to Eaton Manufacturing Company, Cleveland, Ohio, a corporation of Ohio Application September 30, 1943, Serial No. 504,393

6 Claims. (Cl. 85—32)

This invention relates to threaded inserts of the kind made from helically wound wire and aims to provide an improved construction for such inserts.

In my earlier application Serial No. 498,493, filed August 13, 1943, now Patent No. 2,363,662 granted November 28, 1944, I have disclosed a threaded insert formed from helically wound wire of a cross-sectional shape such that the edges of the wire form the internal and external threads of the insert. In the insert referred to the internal and external threads are necessarily of the same pitch which limits the range of usefulness of the insert to some extent and moreover this form of insert does not readily permit the use of the relatively coarser threads which are desirable for obtaining increased holding power where the inserts are used in relatively soft materials.

The present invention seeks to overcome these disadvantages and, as one of its objects, aims to provide a novel insert of the character mentioned which has an extended range of application and use by reason of the fact that the inner and outer threads can be of different pitches.

Another object of my invention is to provide an improved form of wound wire insert having a wide range of application and which permits the use of relatively coarser threads for obtaining increased holding power when the inserts are to be used in relatively soft materials.

Yet another object of my invention is to provide a novel insert construction and method in which the insert is formed of helically wound flat wire and a thread or threads are cut in one or both surfaces of the insert.

The invention also aims to provide a novel insert in which the adjacent convolutions are brazed together prior to the cutting of the thread or threads thereon.

Still another object of this invention is to provide a novel insert construction in which the flat wire for the insert has a tapered projection along one edge which forms a helical thread on the insert and a flat face along the other edge which forms a cylindrical surface for the cut thread.

The invention may be further briefly summarized as consisting in certain novel forms of construction hereinafter described and particularly set out in the appended claims.

Figure 1:
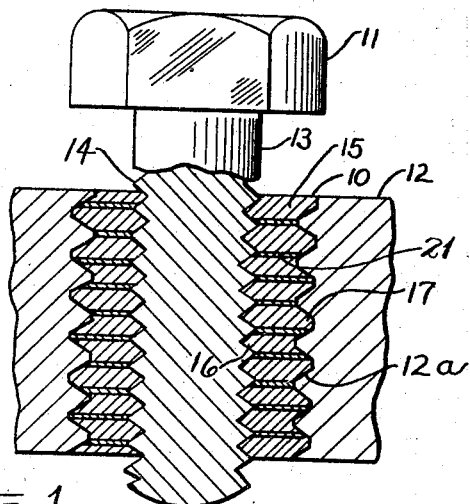
Fig. 1 is a longitudinal sectional view taken through a threaded connection using one form of my novel insert.

In proceeding with a more detailed description of my invention I will refer first to Fig. 1 which shows my novel insert 10 being used in forming a threaded connection between the member 11 and the body 12. The member 11 is here shown as being a screw having a stem 13 provided with a standard thread 14 such as a 1/4"-20 thread. The body 12 may be a body or part formed of relatively soft material such as wood, aluminum or the like in which it is desirable to use the insert 10 as an adapter or for the purpose of obtaining a stronger connection for the screw 11. The body 12 has an internally threaded opening 12a into which the insert 10 is screwed.

The insert 10 comprises a bushing or sleeve formed by a helically wound flat wire or strip 15 and having helical internal and external threads 16 and 17. The internal thread 16 is of a contour and pitch to receive the threaded stem 13 and is obtained as the result of the winding of the wire 15 to helical form. The external thread 17 is cut on the outer surface of the bushing by a suitable die. The thread 17 here shown is a 1/2"-13 thread which is relatively coarse as compared with the internal thread 16 and affords a relatively strong connection when the insert is screwed into the correspondingly threaded opening 12a of the body 12.

Figure 2:
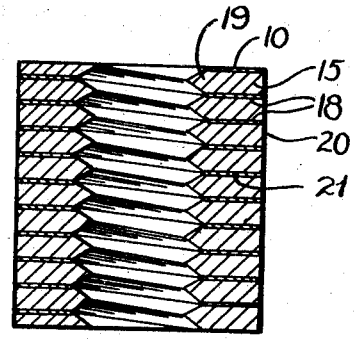
Fig. 2 is a longitudinal sectional view taken through the same insert and showing the same in a partially completed state.

In Fig. 2 I show the insert 10 in a partially completed state in which the wire 15 has been wound to helical form, but in which the external thread 17 has not yet been cut on the external surface of the insert. As shown in Fig. 2 the wire 15 is a flat wire or strip having substantially flat top and bottom faces 18 and, when the wire is closely wound to helical form, the faces 18 of adjacent convolutions are in contiguous relation to each other. One edge of the wire has a tapered projection 19 extending therealong and the opposite edge of the wire has a substantially flat face 20 extending therealong. When the wire is wound to helical form, as just explained, the tapered projection 19 forms the internal helical thread 16 and the flat face 20 forms an external cylindrical surface on which the external thread 17 is cut. The wire used in forming the insert is of such thickness that the tapered projection 19 thereon will produce the thread 16 having the desired pitch and thread contour. The wire used in forming the insert can be of any desired width depending upon the size of opening in which it is to be used in the body 12 and the size of the threaded member to be screwed into the insert.

Since the external thread 17 is relatively coarser than the internal thread 16, it will be observed that its pitch does not correspond with the pitch of the helical convolutions of the wire and that the thread 17 extends across the meeting line of the faces 18 of the adjacent wire convolutions. The cut thread 17 can be formed on the insert by the use of any suitable threading die or threading operation. For strengthening the insert and preventing spreading of its convolutions during the cutting of the thread 17, or during its subsequent handling and use, the adjacent convolutions are joined together by brazing or the like which is indicated at 21.

Figure 3:
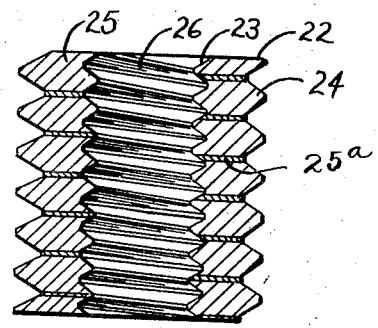
Fig. 3 is a longitudinal sectional view taken through another threaded insert constructed according to my invention.
Figure 4:
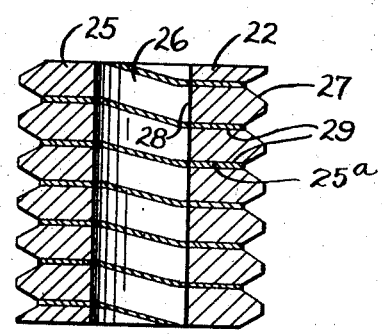
Fig. 4 is a longitudinal sectional view taken through the insert of Fig. 3 and showing the same in a partially completed state.

In Figs. 3 and 4 of the drawings, I have shown an insert 22 similar to the insert 10 but in which the internal thread 23 is a cut thread and the external thread 24 is obtained on the insert as the result of the helical winding of the flat wire 25. Fig. 4 shows the insert partially completed, that is to say, in the condition obtained by the helical winding of the flat wire 25 and prior to the tapping of the opening 26 to provide the internal thread 23 therein.

The flat wire 25 used in forming the insert 22 has a tapered projection 27 along one edge thereof and a substantially flat face 28 along the opposite edge. The wire is wound so that the projection 27 forms the external thread 24 and the flat face 28 defines the cylindrical opening 26. The wire 25 is of such thickness and width, that the thread 27 will be a relatively coarse thread of the desired pitch and contour and such that the desired diameters will be obtained for the thread 27 and the opening 26.

The internal thread 23 can be formed in the opening 26 by the use of any suitable tap or threading operation. The convolutions of the insert 22 are also joined together by brazing or the like shown at 25a. It will be noted that since the internal thread 23 is a relatively finer thread than the external thread 27, its pitch is less than the pitch of the wire convolutions and extends across the meeting line of the flat faces 29 of the adjacent wire convolutions.

Figure 6:
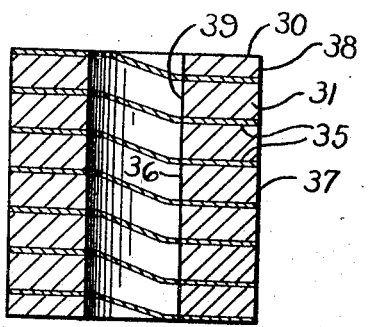
Fig. 6 is a longitudinal sectional view showing the insert of Fig. 5 prior to the cutting of the threads thereon.
Figure 5:
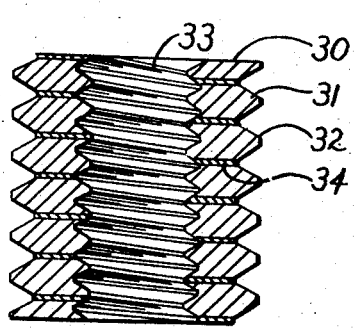
Fig. 5 is a longitudinal sectional view taken through still another form of my novel insert.

In Figs. 5 and 6 I have shown still another insert 30 which is also formed from helically wound flat wire 31 but which has both its external and internal threads 32 and 33 cut thereon. The insert 30 also has its adjacent convolutions connected together as by means of brazing, or the like, indicated at 33.

Fig. 6 shows the insert 30 in its partially completed state, that is to say at the stage in which the wire 31 has been wound to helical form and the adjacent convolutions have been brazed together, but prior to the cutting of the external and internal threads 32 and 33 thereon. The wire 31 used in making this insert is of substantially rectangular cross-section having flat top and bottom faces which provide co-extensive surfaces 35 on the adjacent convolutions when the wire has been helically wound. The edges of the wire have substantially flat faces 36 and 37 extending therealong and when the wire has been wound into bushing form these flat faces form the outer and inner cylindrical faces 38 and 39 on which the threads 32 and 33 are cut. The wire 31 is of a thickness and width such that when it is wound into a bushing such bushing will be of the desired length and will have outer and inner diameters of proper size for the cutting of the desired threads 32 and 33 thereon.

By brazing the adjacent convolutions of the helically wound wire 31 together prior to the cutting of the threads 32 and 33 thereon the adjacent convolutions will be held against spreading during the threading operation. Such brazing also results in a stronger insert being formed and enables the insert to be embodied in a threaded connection without becoming twisted or distorted. The brazing can be carried out by the use of any suitable operation or apparatus and in all cases the brazing becomes a permanent part of the insert.

From the foregoing description and the accompanying drawing it will now be readily understood that I have provided a novel form of threaded insert having a wider range of application and use than similar inserts heretofore proposed, and which also make possible the use of a relatively coarser thread on the outside of the insert which is desirable in obtaining a stronger connection when the insert is used in a body of relatively soft material.

While I have illustrated and described my novel threaded insert in more or less detail, it will be understood, of course, that I do not wish to be correspondingly limited but regard my invention as including all changes and modifications coming within the spirit of the invention and the scope of the appended claims.

Having thus described my invention, I claim:

1. An insert of the character described, comprising a bushing formed merely of helically wound flat wire and having adjacent convolutions brazed together and also having a helical thread cut in at least one surface thereof, the pitch of the thread being different than the pitch of the helically wound wire.

2. An insert of the character described, comprising a bushing formed merely of a helically wound rectangular wire and having adjacent convolutions brazed together and also having a thread cut in at least one surface thereof.

3. An insert of the character described, comprising merely wire helically wound to bushing form and with adjacent convolutions brazed together, said insert having a cut thread in at least one surface thereof.

4. An insert of the character described, comprising merely helically wound flat wire having a tapered projection along one edge which forms a helical thread on the insert, the adjacent convolutions of said wire being brazed together and said wire initially having a flat face along its opposite edge, and a thread cut in the surface formed by said flat face of the wire.

5. An insert of the character described, comprising merely a bushing formed of helically wound wire initially rectangular in shape, adjacent convolutions of the bushing being brazed together, and cut threads of different pitches on the inner and outer surfaces of the bushing.

6. An insert of the character described, comprising merely helically wound flat wire having a tapered projection along one edge which forms a helical thread on the insert, the adjacent convolutions of said wire being brazed together and said wire initially having a flat face along its opposite edge, and a thread cut in the surface formed by said flat face of the wire and having a pitch which is different than the pitch of said tapered projection.

HOWARD J. FINDLEY.

REFERENCES CITED

The following references are of record in the file of this patent:

UNITED STATES PATENTS

| Number | Name | Date |
|---|---|---|
| 561,579 | Gare | June 9, 1896 |
| 2,210,353 | Barnes | Aug. 6, 1940 |
| 2,262,450 | Caminez | Nov. 11, 1941 |
| 2,302,359 | Wagner | Nov. 17, 1942 |
| 2,306,806 | Hoopes | Dec. 29, 1942 |

FOREIGN PATENTS

| Number | Country | Date |
|---|---|---|
| 119,132 | Austria | June 3, 1943 |